United States Patent
Nevin

(10) Patent No.: US 7,251,118 B2
(45) Date of Patent: Jul. 31, 2007

(54) METHOD AND APPARATUS FOR LARGE SCALE STORAGE OF ELECTRICAL POTENTIAL

(76) Inventor: Donald Nevin, 129 LaFayette Dr., P.O. Box 678, Syosset, NY (US) 11791

( * ) Notice: Subject to any disclaimer, the term of this patent is extended or adjusted under 35 U.S.C. 154(b) by 307 days.

(21) Appl. No.: 10/957,203

(22) Filed: Oct. 1, 2004

(65) Prior Publication Data

US 2005/0106807 A1    May 19, 2005

Related U.S. Application Data

(60) Provisional application No. 60/507,635, filed on Oct. 2, 2003.

(51) Int. Cl.
*H01G 4/06* (2006.01)
*H01G 4/005* (2006.01)

(52) U.S. Cl. .................. 361/311; 361/303; 361/301.2

(58) Field of Classification Search ............ 361/311, 361/303–305, 301.2
See application file for complete search history.

(56) References Cited

U.S. PATENT DOCUMENTS

| 4,730,239 | A | * | 3/1988 | Currie et al. ............ 361/502 |
| 5,315,131 | A | * | 5/1994 | Kishimoto et al. ......... 257/57 |
| 5,691,594 | A | * | 11/1997 | Takeuchi et al. .......... 310/330 |

* cited by examiner

*Primary Examiner*—Eric Thomas
(74) *Attorney, Agent, or Firm*—Robert L. Epstein; Epstein Drangel Bazerman & James

(57) ABSTRACT

An electrical storage device, such as a capacitor, which includes a high surface area material such as zeolite as a substrate, a suitable dielectric layer proximate to the substrate, and necessary electrically conductive layers. The substrate is non-planar and has a rigid, sponge-like internal structure with a high surface area to volume ratio defined by nanometer scale openings connected by passageways.

9 Claims, 5 Drawing Sheets

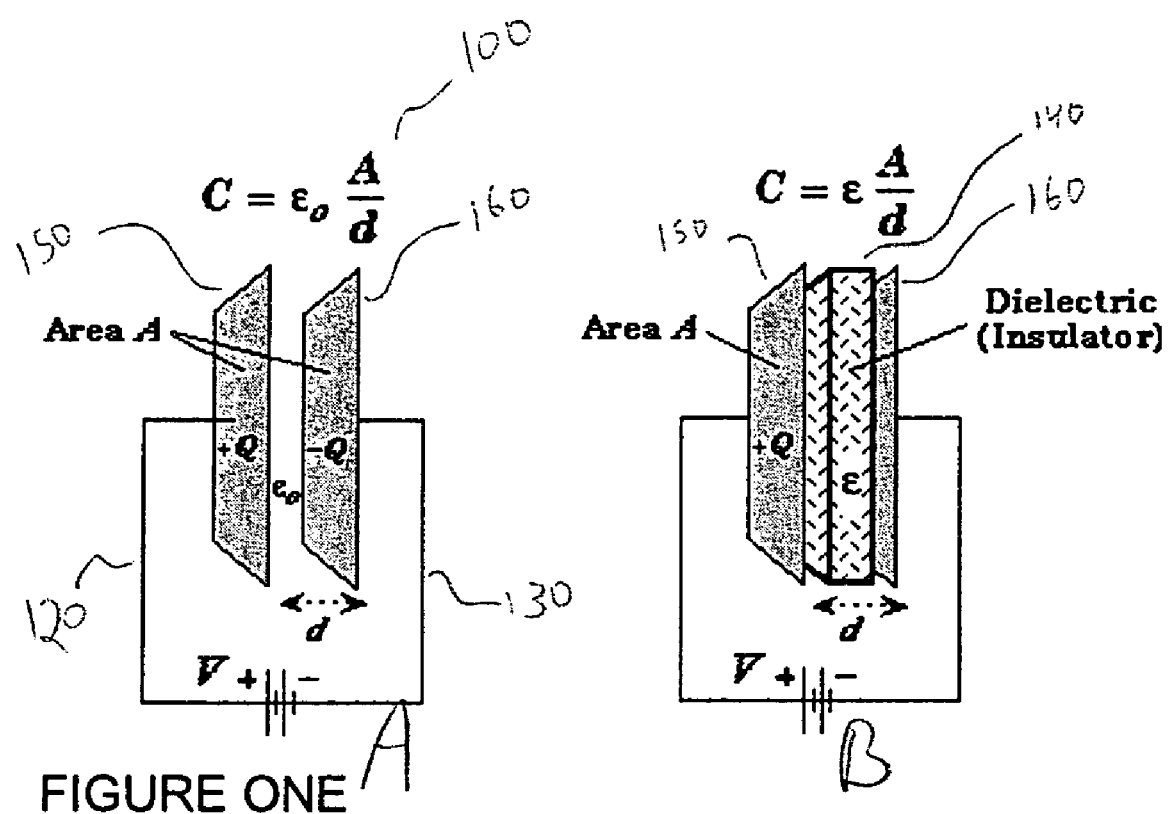
FIGURE ONE

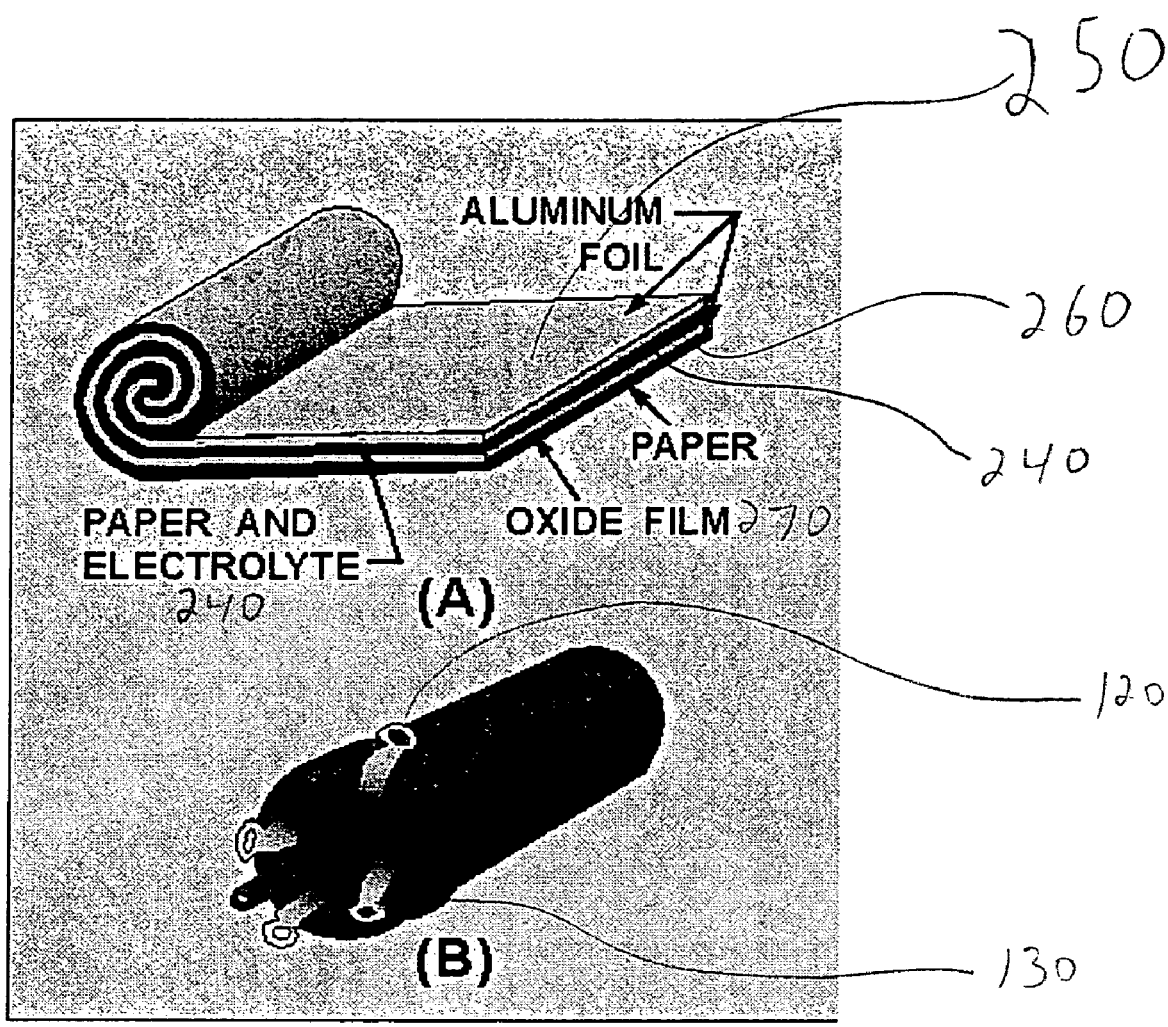
FIGURE TWO

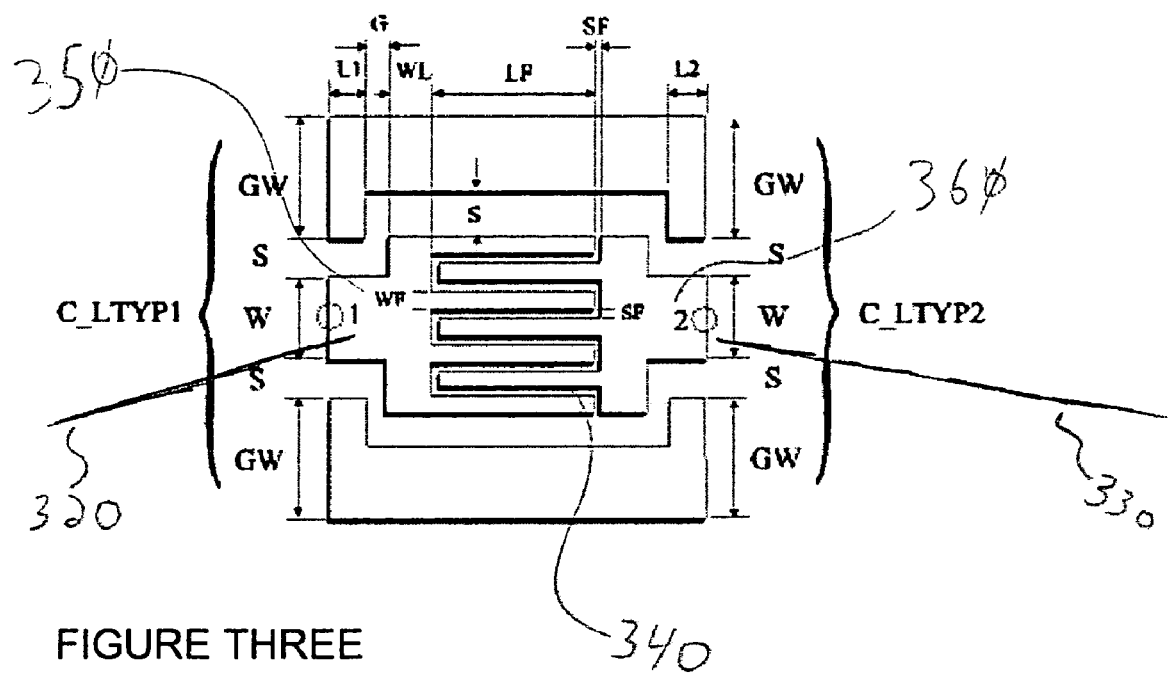
FIGURE THREE

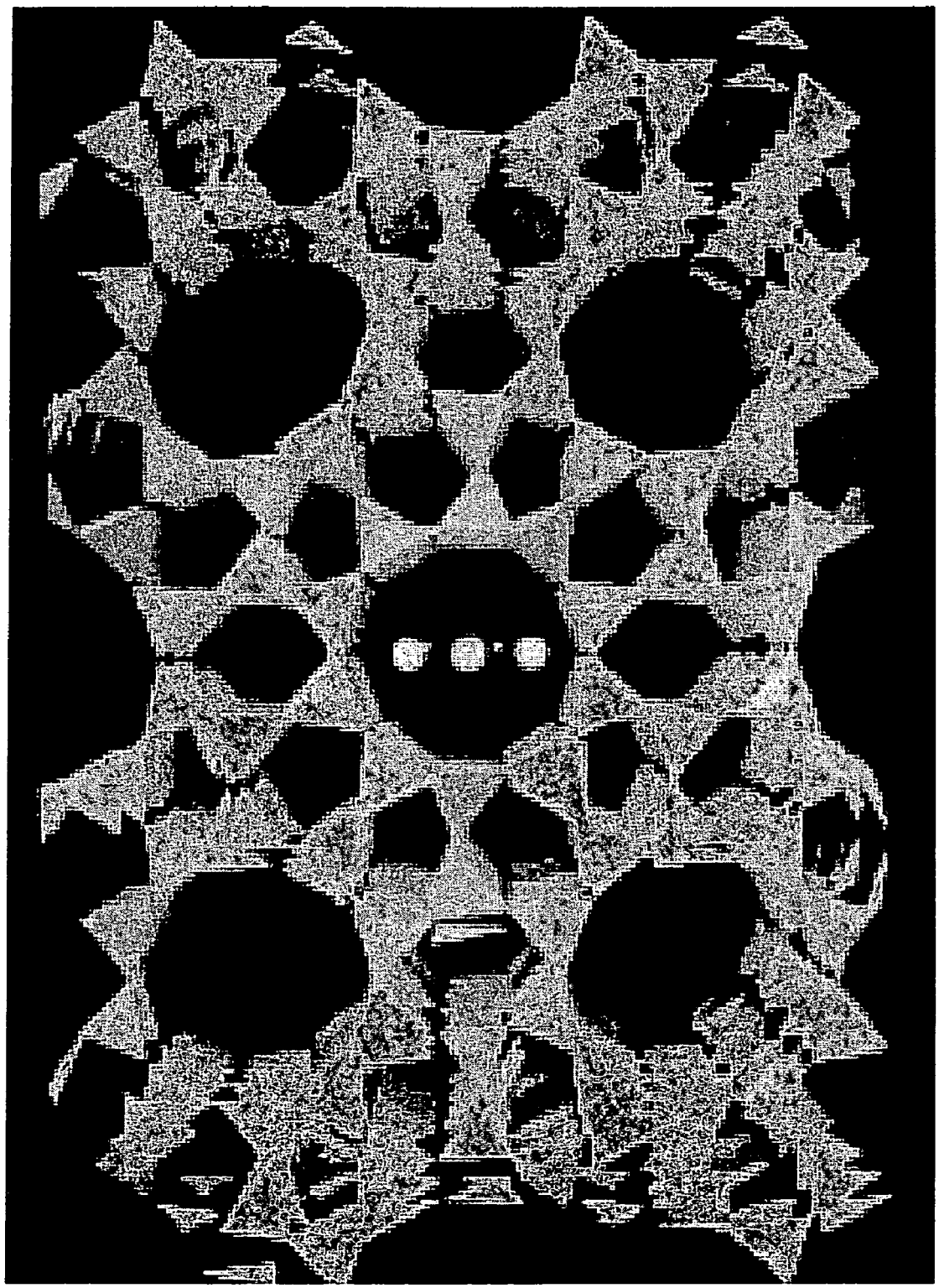
FIGURE FOUR

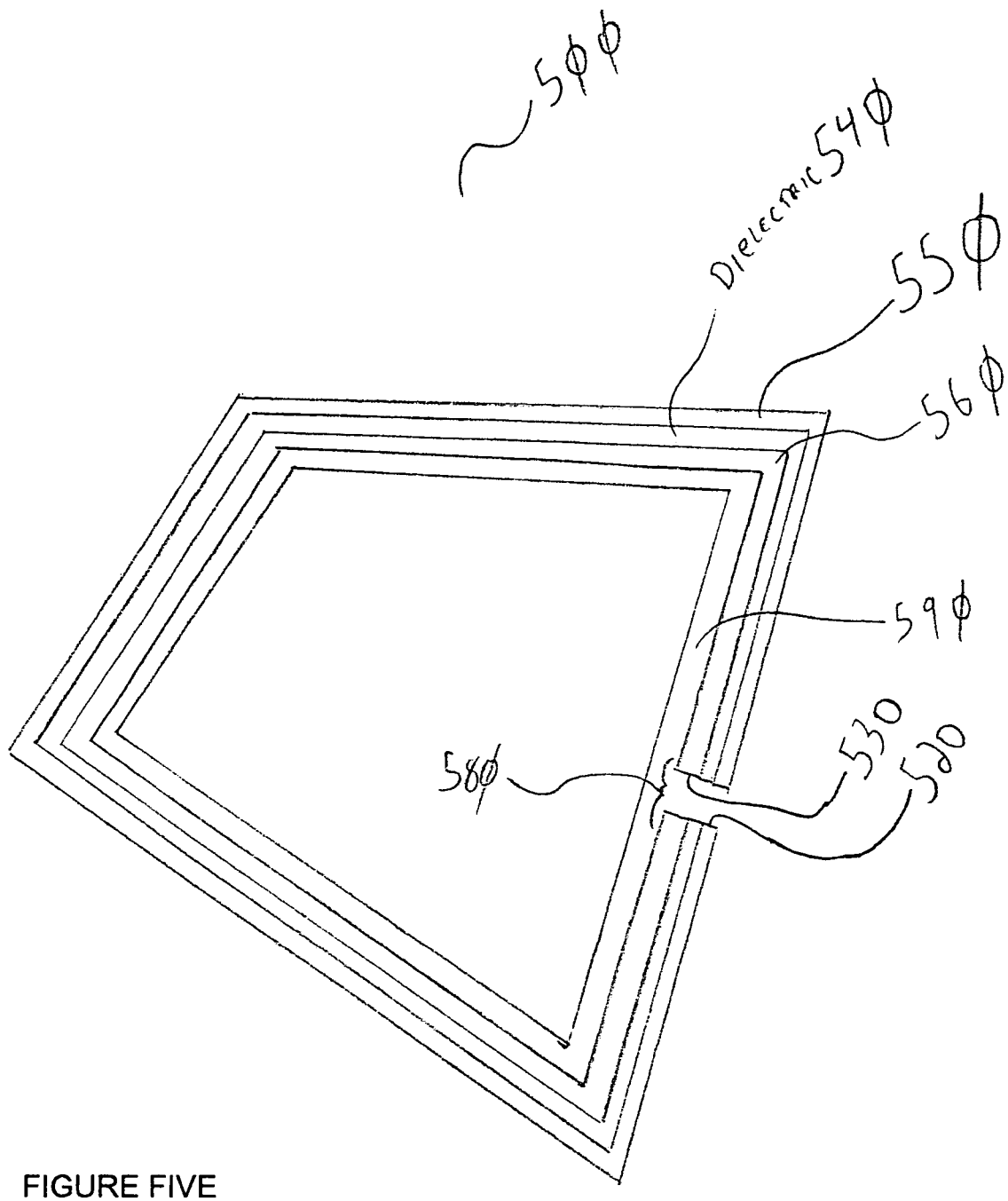
FIGURE FIVE

METHOD AND APPARATUS FOR LARGE SCALE STORAGE OF ELECTRICAL POTENTIAL

CROSS REFERENCE TO RELATED APPLICATIONS

This application claims priority to provisional application Ser. No. 60/507,635; filed 2 Oct. 2003 and titled "Method and Apparatus for Large Scale Storage of Electrical Potential"

STATEMENT REGARDING FEDERALLY SPONSORED R & D

Not Applicable

REFERENCE TO A MICROFICHE APPENDIX

Not Applicable

BACKGROUND OF THE INVENTION

The present invention relates to a method and apparatus for storing electrical potential and more particularly to such a method and apparatus which uses a zeolite in a capacitor having plates of high surface area.

Electrical storage devices are crucial to the efficient operation of innumerable systems. Perhaps the most widely used electrical device is the "capacitor" (formerly called the "condenser"). Capacitors, in their simplest form, consist of two opposing conductive plates, separated by an insulating dielectric, and two electrical leads (each connected to a different one of the conductive plates). An electric potential is applied across the leads, and electricity is then stored in the capacitor. A capacitor's ability to store electric charge, called its "capacitance", is measured in Farads (F). The higher the capacitance, the greater the capacitor's ability to store electric potential/electric charge. capacitance is proportional to the area of the plates in the capacitor. For example, in the case of parallel-plate capacitor, capacitance is equal to the permittivity of the dielectric, divided by the distance between the plates, and multiplied by the area of these plates. Thus, increasing the area of the plates increases the capacitance of the capacitor.

BACKGROUND OF THE INVENTION a. Field of the Invention

The present invention is in the general class of electrical storage devices; more particularly, it is in the area of capacitors; still more particularly, it is in the area of capacitors having high surface area plates; most specifically, it is an electrical storage device (e.g. capacitor) which patterns at least one of its plates upon the high surface area material zeolite, so as to produce a device with high surface area plates.

b. Background of the Invention

Various attempts have been made to increase the surface area of the plates in a capacitor. For example, electrolytic capacitors have employed plates which are rolled like pastry, to increase the surface area of those plates. The present invention makes use of a class of materials, called "high surface area" materials which have an exceptionally large (relative to volume) surface area. An excellent example of this type of material is "zeolite". Although there are many different forms of zeolite, most if not all are high surface-area materials.

Zeolites are regular crystalline structures which are essentially porous. Zeolites have a structure which is similar to that of a natural sponge or hardened coral. Internally, zeolites are rigid sponge-like structures with uniform but very small openings (e.g., 0.1 to 1.2 nanometers or 0.1 to 1.2× $10^{-9}$ meters). It is this sponge-like structure of the zeolite which results in many internal passageways connecting the openings. Each passageway exposes additional surface area, thereby contributing to the large surface area of the zeolite, which makes it ideal for use in the present invention.

For example, one gram of a zeolite, approximately the size of a sugar cube, may have a total surface area of 1,000 square meters. At least a portion of this large surface area is used to support one or more plates of a capacitor, thereby providing a high surface area plate useful in providing high capacitance. (Note that while zeolite is used as the example of high surface area material throughout this application, it is so used only for illustrative purposes only, and it is to be understood that other high surface area materials could function in its place.

BRIEF SUMMARY OF THE INVENTION

The present invention is a method and apparatus for large-scale storage of electric potential in a zeolite-containing structure. The zeolite-containing structure is used as a substrate for at least on of the plates (conductive electrodes) of a charge storage device or capacitor. Since the zeolite has a high surface area, so will the conductive electrodes made from and/or patterned upon that material, thereby giving the overall device a high capacity to store electric potential or charge.

There is provided an electrical storage device comprising a high surface area material (e.g. zeolite) substrate comprising at least one zeolite crystal having a surface, and a first electrically conductive layer proximate to at least a portion of said surface, and a second electrically conductive layer, with a dielectric layer interposed therebetween. In one embodiment, said first electrically conductive layer comprises a conductive film. Said second electrically conductive layer may also comprise a conductive film; indeed, it may comprise a monomolecular metal film. The dielectric layer may comprise periodic mesoporous organosilica or other suitable dielectric material.

BRIEF DESCRIPTION OF THE DRAWINGS

FIG. 1 is a diagram showing a simple planar capacitor of the prior art.

FIG. 2A shows the inside (prior to final assembly) of a cylindrical capacitor of the prior art.

FIG. 2B shows the outside (after final assembly) of a cylindrical capacitor of the prior art.

FIG. 3 shows an interdigitated capacitor of the prior art.

FIG. 4 which depicts the overall structure (prior to final assembly) of a zeolite-based capacitor according to the present invention.

FIG. 5 shows, in close-up, an idealized detailed drawing of the sectional view circled in FIG. 4 (Note that this FIG. is for purposes of explanation, and is not drawn to any absolute or relative scale.)

DETAILED DESCRIPTION

In order to better understand and appreciate the advantages of the current invention, and to understand how it is an improvement over the prior art, it is useful to review 5 common capacitor types of the prior art.

Reference is now made to FIG. 1, which shows a parallel plate capacitor of the prior art. Note the first electrically conductive layer (here, a planar "plate") 150, the second electrically conductive layer (here, a planar "plate") 160, and the dielectric layer 140 therebetween. Note also first electrode lead 120 and second electrode lead 130.

Reference is now made to FIG. 2, which depicts a cylindrical, electrolytic capacitor according to the prior art. The electrically conductive layers in this type of capacitor are not planar. Note the first electrically conductive layer (here, a rolled layer, rather than a planar "plate") 250, the second electrically conductive layer (here, a rolled layer, rather than a planar "plate") 260, and the dielectric electrolyte-paper layer 240 therebetween. Note also first electrode lead 220 and second electrode lead 230. Note further the substrate 270, which here is an oxide film.

Reference is now made to FIG. 3, which depicts an interdigitated capacitor according to the prior art. Note the first electrically conductive layer 350, the second electrically conductive layer 360, and the dielectric layer 340 therebetween. Note also first electrode lead 320 and second electrode lead 330.

Reference is now made to FIG. 4, which depicts the overall structure (prior to final assembly) of a zeolite-based capacitor according to the present invention.

Reference is now made to FIG. 5, which depicts in close-up a zeolite-based capacitor (sometimes referred to herein as a 'zeocapacitor') according to the present invention. Note the first electrically conductive layer 550, the second electrically conductive layer 560, and the dielectric layer 540 therebetween. Note also first electrode lead 520 and second electrode lead 530; these leads may be brought down through access port 580. In the presently preferred embodiment, all of the foregoing is proximate to a zeolite substrate 590.

Note that a zeocapacitor according to the present invention has a decidedly non-planar shape to its electrically conductive layers; like the entire capacitor, the electrically conductive layer in the zeocapacitor take on the shape of the zeolite substrate 590 itself. Despite its heretofore unforeseen uncommon shape, a zeocapacitor is governed by the same physical principles which govern all capacitors, and which are well-known to those of ordinary skill in the art.

The processes by which a zeocapacitor may be made are now described. Vapor deposition and related industrial coating processes which are well-known to those of ordinary skill in the art, and therefore need not be disclosed in detail; however such deposition processed have never been employed to create a zeolite-based electric potential/charge storage device (zeocapacitor) The method for fabricating a zeocapacitor according to the present invention is as follows. First, select a zeolite sample to have openings and passageways of an appropriate scale depending upon the charge storage requirements of the desired capacitor and the properties of the materials to be deposited. Next, place the zeolite sample (now considered a zeolite substrate 590) into a sealed chamber, then evacuate said chamber. Next, fill said evacuated chamber with an atmosphere containing the material or materials to be deposited on the surface of the zeolite substrate 590 to form the conductive film first electrically conductive layer 550, then create inside the chamber the conditions which will deposit a conductive film (preferably a monomolecular film) on the surface of the zeolite substrate 590. This conductive film thusly deposited is the first electrically conductive layer 550. Next, evacuate the chamber and clean and otherwise prepare it to be filled with an atmosphere containing the materials (which may comprise periodic mesoporous organosilica or another suitable material) to be deposited as dielectric layer 540 onto the surface of the first electrically conductive layer 550; Next, create inside the chamber the conditions necessary to cause said materials to be deposited as dielectric layer 540 to be deposited upon said conductive film first electrically conductive layer 550 in a desirable amount, considering that it is desirable to have the dielectric layer 540 thin enough to produce desired performance, yet thick enough to prevent arcing. Next, evacuate the chamber and clean and otherwise prepare it to be filled with an atmosphere containing the material to be deposited upon said dielectric 540 so as to form second electrically conductive layer 560. Next, fill said evacuated chamber with an atmosphere containing the material or materials to be deposited upon said dielectric 540 so as to form second electrically conductive layer 560. Next, create inside the chamber the conditions necessary to cause said material or materials to be deposited upon said dielectric layer 540 to create second electrically conductive layer 550. Next, provide conductive lead means, such as conductive lead 520 and conductive lead 530, (each connected to a different one of the conductive plates) to each electrode, through access port 580. The zeocapacitor 500 may be charged (and discharged) through those conductive lead means 520 and 530.

It will now be appreciated that there is provided an electrical storage device comprising a high surface area material (e.g. zeolite) substrate comprising at least one zeolite crystal having a surface, and a first electrically conductive layer proximate to at least a portion of said surface, and a second electrically conductive layer, with a dielectric layer interposed therebetween. In one embodiment, said first electrically conductive layer comprises a conductive film. Said second electrically conductive layer may also comprise a conductive film; indeed, it may comprise a monomolecular metal film. The dielectric layer may comprise periodic mesoporous organosilica or other suitable dielectric material.

While a limited number of embodiments of the present invention have been here specifically disclosed, which can function individually or cumulatively, and many of which are not limited to use in a method and apparatus for large scale storage of electrical potential, it will be apparent that many variations may be made therein, all without departing from the spirit of the invention as defined in the following claims.

The invention claimed is:

1. An electrical storage device comprising a non-planar substrate; said substrate having a substantially rigid, sponge-like internal structure with a high surface area to volume ratio defined by nanometer scale openings connected by passageways to form a substrate surface, a first electrically conductive layer situated proximate at least a portion of said substrate surface; a second electrically conductive layer; and a dielectric layer interposed between said first electrically conductive layer and said second electrically conductive layer.

2. The device of claim 1 wherein said substrate comprises at least one zeolite crystal.

3. The device of claim 1 wherein said substrate comprises zeolite.

4. The electrical storage device of claim 1 wherein said first electrically conductive layer comprises a conductive film.

5. The electrical storage device of claim 1 wherein said second electrically conductive layer comprises a conductive film.

6. The electrical storage device of claim 4 wherein said second electrically conductive layer comprises a monomolecular metal film.

7. The electrical storage device of claim 5 wherein said second electrically conductive layer comprises a monomolecular metal film.

8. The storage device of claim 1 wherein said dielectric layer comprises periodic mesoporous organosilica.

9. The storage device of claim 1 wherein said dielectric layer is deposited upon said first electrically conductive layer.

* * * * *